United States Patent [19]
Osawa

[11] Patent Number: 5,875,360
[45] Date of Patent: Feb. 23, 1999

[54] FOCUS DETECTION DEVICE

[75] Inventor: Keiji Osawa, Tokyo, Japan

[73] Assignee: Nikon Corporation, Tokyo, Japan

[21] Appl. No.: 780,327

[22] Filed: Jan. 8, 1997

[30] Foreign Application Priority Data

Jan. 10, 1996 [JP] Japan .................................. 8-019397

[51] Int. Cl.⁶ .......................... G03B 13/00; G03B 15/02
[52] U.S. Cl. .......................... 396/106; 396/109; 396/114
[58] Field of Search .................................... 396/106, 107, 396/108, 109, 110, 111, 114

[56] References Cited

U.S. PATENT DOCUMENTS 4,901,102  2/1990  Karasaki et al. ........................ 396/114
4,935,613  6/1990  Ishiguro et al. ........................ 396/109

FOREIGN PATENT DOCUMENTS 63-82407  4/1988  Japan .

*Primary Examiner*—Russell E. Adams
*Attorney, Agent, or Firm*—Oliff & Berridge

[57] ABSTRACT

A focus detection device that is capable of performing focus detection in several focus detection areas within a photographic image plane using, for example, a phase difference method and that uses an auxiliary illumination light with at least one of the areas also includes infrared light cut filters that block the transmission of light above predetermined wavelengths. In particular, the maximum wavelength of the light transmitted by the infrared cut filter for one of the focus detection areas is different than the maximum wavelength of the light transmitted by the infrared cut filter for another one of the focus detection areas.

23 Claims, 3 Drawing Sheets

FOCUS DETECTION DEVICE

BACKGROUND OF THE INVENTION

1. Field of the Invention

The present invention relates to focus detection devices having an arrangement of filters, e.g., infrared cut filters, for use in cameras and the like.

2. Description of Related Art

Generally, in focus detection devices that utilize phase difference methods (in which defocus amounts are calculated and then used to drive a lens), luminous flux is transmitted through different regions of the photographic lens and forms an image through a plurality of re-imaging lenses onto a corresponding plurality of line sensors. The focus state (e.g., a defocus amount) of the photographic lens is detected from the output of these line sensors. Photoelectric conversion elements, such as for example CCDs, which typically are utilized as these line sensors, generally have a peak spectral sensitivity in the infrared regions. Accordingly, a filter is used with the focus detection optical system in order to reduce light in the infrared regions. Such filters are referred to as infrared cut filters or infrared reduction filters. These filters change the luminosity factor of the photoelectric conversion elements, so that it is more comparable to the visual sensitivity of the human eye. Frequently, a reflecting type of filter has been utilized as a type of infrared cut filter. Such reflecting type filters are made by coating a glass substrate with many layers of film.

In general, the filter can be positionally arranged at a number of locations within the camera. However, there are many cases in which the view field mask, in the vicinity of the primary focal plane of the photographic lens, is positionally arranged on the front plane of the field lens. This results in the infrared cut filter being positioned on the front side of the field lens.

FIG. 2 shows an example of a positional arrangement of an infrared cut filter. FIG. 2 shows a focus detection device capable of focus detection in a plurality of areas. Specifically, the focus detection areas are provided at the center of the image plane and at two points, one to the left and one to the right of the image plane center. Luminous flux penetrating through the photographic lens L, passes through a half-transparent mirror M1 and is reflected by a reflecting mirror M2, so that the light rays reach a view field mask SM. Openings SM1–SM3 are provided in the view field mask SM at the prescribed focus detection areas. The opening SM1 corresponds to the focus detection area in the center of the image plane, and the openings SM2 and SM3 correspond to the areas at the left and right of the center of the image plane. The standard construction of the focus detection device generally includes a field lens L0, a reflecting mirror M3, an aperture mask AM, a re-imaging lens L2, and a line sensor CS, etc. As these elements are known in the art, a further explanation is omitted herein.

Typically, the function of the view field mask SM is to prescribe the focus detection areas. Therefore, in the case of a camera, the view field mask is positionally arranged in the vicinity of the primary focal plane, which is arranged in a position corresponding with the surface of the film. The infrared cut filter IR is arranged on the top side (in FIG. 2) of the view field mask SM. This is also referred to as the front surface of the view field mask SM. Additionally, in conjunction with the view field mask SM and the field lens L0, etc., the infrared cut filter IR is fixed by an adhesive or the like in a holder (not shown) for the focus detection device. The front surface (also referred to as the input surface or upstream surface) of the field lens L0 has the smallest angle at which the luminous flux can enter, within the focus detection optical system. Accordingly, the infrared cut filter IR preferably is arranged on the front surface of the field lens L0, so that changes in the angles of the entering rays, which occur due to the change of transparency characteristic of the infrared cut filter IR, can be minimized. Additionally, as this filter includes a glass substrate, the entrance of dust or the like to the field lens L0 is prevented by this location of the infrared cut filter IR.

It also has been proposed, in the event that the subject is dark or the contrast is low, that focus detection be performed by illuminating the subject. In such a case, auxiliary illumination light is cast from a direction other than that of the optical axis of the photographic lens from an auxiliary illumination device provided within the camera body, or within the accessories attached to the camera. Japanese Laid-Open Patent Application No. 63-82407 discloses a focus detection device capable of focus detection in three focus detection areas within the image plane, similar to what is shown in FIG. 2. An auxiliary illumination device is provided to illuminate each focus detection area, respectively.

FIG. 3 shows the construction of the optical system for such an auxiliary illumination device. FIG. 4 shows the relation of the auxiliary illumination luminous flux to the three focus detection areas. In order to illuminate the three areas, three auxiliary illumination light sources LD1–LD3, formed by LEDs or the like, are provided behind (on the right side in FIG. 3) a light-casting lens TL. In FIG. 4, p, q and r denote the auxiliary illumination luminous flux of light sources LD2, LD1 and LD3, respectively. The relation of the luminous flux to the focus detection areas is altered by the focal length of the photographic lens. When the photographic lens has a given focal length, the focus detection areas are defined respectively as P, Q and R. When the photographic lens has half that given focal length, the focus detection areas are defined as P2, Q2 and R2. In the event that the focal length is shorter than one half the given focal length, the areas to the left and right of the center area fall outside of the auxiliary illumination luminous fluxes p and r. Consequently, focus detection cannot be performed by utilizing auxiliary illumination light in the left and right areas for all desired focal lengths.

The device of Japanese Laid-Open Patent Application No. 63-82407 can operate in a mode in which first, the auxiliary illumination light sources LD1–LD3 all cast light. Then, the area (from amongst the three is areas) in which the reflective light quantity is the largest, is considered to be the area containing the nearest photographic subject. Accordingly, subsequent light casting for focus detection is performed only for that one area. Using this method, if the photographer selects the area containing the nearest subject as the area to focus upon, focus detection can be performed. One drawback of this process is that auxiliary illumination light must be cast two times. Thus, it takes a certain amount of time until photography can be performed, which is a drawback. In addition, the first light casting is performed simultaneously for all areas, resulting in a large consumption of power from the power source, which is a problem.

In view of the above problems, one might consider limiting focus detection area selection only to a manual selection by the photographer. In this case, preferably the auxiliary illuminating light is cast only on the manually selected area. Therefore, the light casting of illumination light need only be performed once, which avoids the problems described above. However, several auxiliary illumination light sources must be provided (e.g., one for each area) and it is necessary to provide space for them within the camera body or within the accessories, so that the camera becomes large in size. This arrangement still suffers from the problem, described above, when the focal length of the photographic lens becomes short, i.e., the left and right areas move out of the light casting range of the auxiliary illumination light. Consequently, focus detection cannot be performed by auxiliary illumination light within the left and right areas for all lens positions, which is a problem. The center area, however, is within the center of the light casting range regardless of the focal length of the photographic lens, and thus it is never outside of the light casting range.

Accordingly, as a method to allow there to be no restriction of the focal length of the photographic lens and so as to lessen the influence of the light casting of auxiliary illumination light on the size of the camera and the like, or on power source consumption, so that, for example, focus detection can be performed in several areas, even in areas in which there is a common level of brightness, one might consider providing an auxiliary illumination light source only for the center area, so that focus detection is performed only in the center area using auxiliary illumination light.

However, when this is performed in focus detection devices in which focus detection can be performed in the three areas denoted in FIG. 2, for example, the following type of problems occur. Generally, light from the LED or the like, which is used as an auxiliary illumination light source, has wavelengths that are on the longer side of the human visual region. However, as described above, the region in which the wavelengths are long exerts a negative influence on the focus detection accuracy due to the spectral sensitivities of CCDs. Thus, as described above, an infrared cut filter is provided. The light from the auxiliary illumination light also passes through the focus detection optical system, resulting in the wavelengths of this light being reduced by the infrared cut filter (so that light from the long wavelengths does not pass therethrough). In improving the accuracy of this focus detection system, the infrared cut filter blocks light having wavelengths above, for example, 680 nm. However, because the wavelengths of light from the LED are about 700 nm, if such an infrared cut filter is used, the auxiliary illumination light is also blocked. Therefore, the infrared cut filter used in focus detection optical systems that can use auxiliary illumination light is typically designed so as to block wavelengths above about 710 nm. In this case, as compared to a case in which a 680 nm filter is used, a certain extent of light source error due to long wavelength light from various types of light, must be allowed in regular focus detection precision.

In the construction of FIG. 2, one infrared cut filter IR is arranged in front of the field lens L0. In this construction, when focus detection is performed using the auxiliary illumination light in the center area, it is necessary to define filter IR as a filter that blocks light above a wavelength of about 710 nm. If this is done, then the cutoff wavelength of the right and left areas, in which focus detection using auxiliary illumination light is not performed, also becomes 710 nm, and the focus detection accuracy is detrimentally affected by long wavelength light from illumination during regular focus detection. Since focus detection accuracy in areas separated from the optical axis (i.e., at areas other than the center area) is influenced, for example, by aberrations and the like of the photographic lens, as compared to the center area, the accuracy on both sides (i.e., the left and right sides) drops. Further, with the same 710 nm filter, even though accuracy in the center area remains within a range in which there are no practical problems, accuracy drops in the left and right areas, which is a problem.

A filter exchange mechanism can be provided to change the filters during focus detection, and during auxiliary illumination light focus detection without causing any optically-related problems. However, this requires that a fairly complicated mechanism be provided around the focus detection device, which enlarges the camera body. Moreover, a problem occurs in that the filter exchange causes a long amount of time to be taken during photography, and the like. Furthermore, in a focus detection device performing focus detection in a plurality of areas, the device itself is already fairly large, and there is little available space for the introduction of a filter change-over mechanism.

SUMMARY OF THE INVENTION

Embodiments of the present invention were conceived to address the problems described above, and aim, in a focus detection device performing focus detection using auxiliary illumination light, to prevent adverse influences from occurring in focus detection areas where auxiliary illumination light is not used, such adverse influences being due to differences in illumination light sources even when the cut-off wavelength of filters used in the system becomes a fairly long wavelength. Thus, one object of embodiments of the invention is to prevent the reduction of focus detection accuracy in areas in which auxiliary illumination light is not used.

In order to achieve this and other objects, focus detection devices according to embodiments of the present invention include light filters that block the transmission of different wavelengths of light depending on which one of the plurality of focus detection areas the filter is provided. For example, the invention is applicable to focus detection devices having several focus detection optical systems that are combined in a phase difference method in which the focus state of the photographic lens is detected from the relative shifting of a secondary object image. As is known in such systems, the object image formed by the photographic lens is further re-formed onto a plurality of (i.e., two or more) line sensors, by a corresponding plurality of re-imaging lenses. The light cut filters are respectively positioned within each light path of the several focus detection optical systems. The longest wavelength that is transmitted by one of the light cut filters, located in at least one of the focus detection areas, is different from the longest wavelength that is transmitted by another one of the light cut filters, located in another one of the focus detection areas. Preferably, the filter provided for the focus detection area used with auxiliary illumination light allows for light having longer wavelengths to be transmitted as compared to the other filters in the device. For example, the filter provided for the focus detection area that uses auxiliary illumination light can block light having wavelengths above about 710 nm, whereas the filters for the other focus detection areas block light having wavelengths above about 680 nm.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 2:
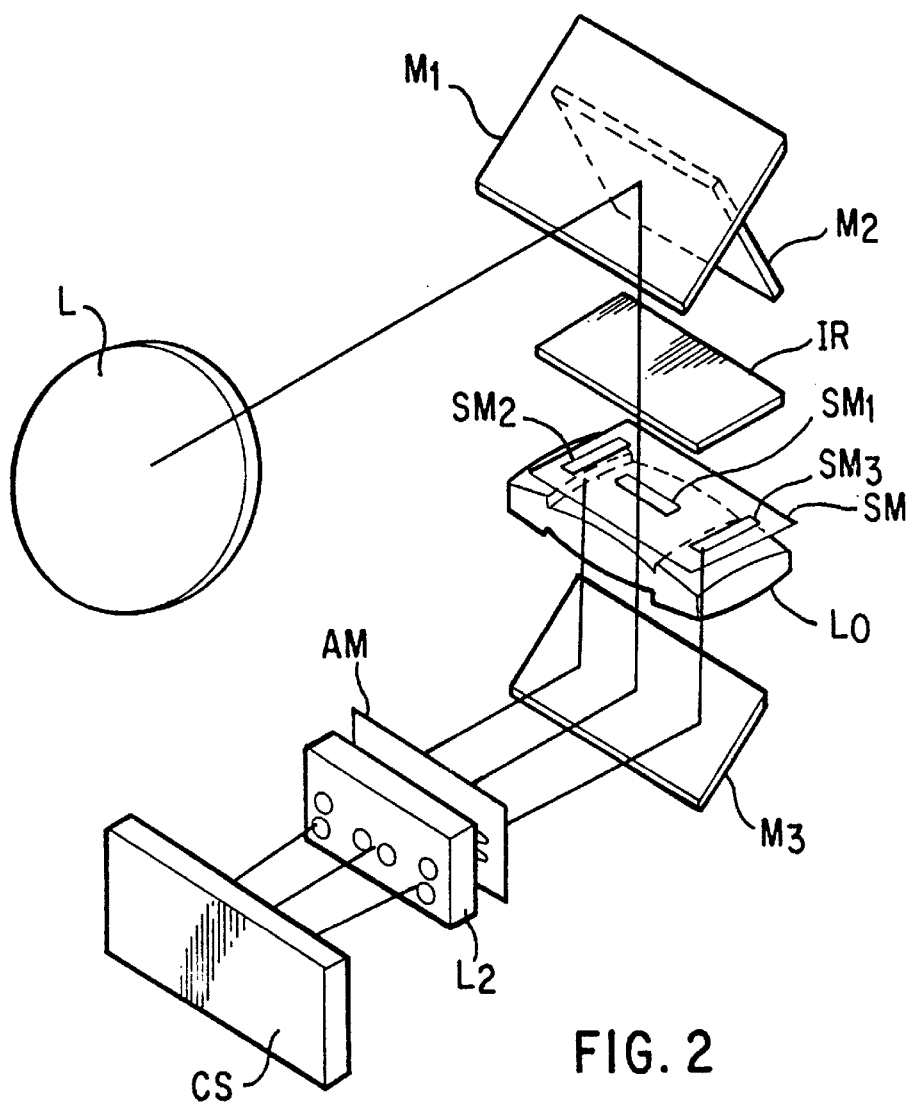
FIG. 2 is an oblique schematic view of a conventional focus detection device.
Figure 3:
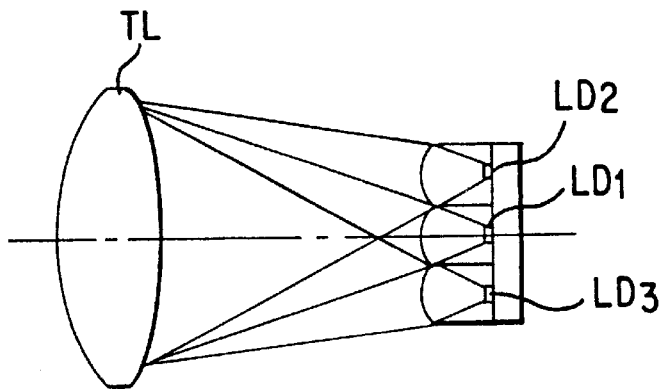
FIG. 3 is a cross-sectional side schematic view of a conventional auxiliary illumination device.
Figure 4:
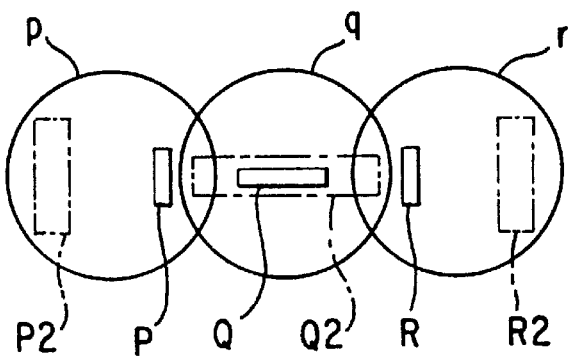
FIG. 4 is a front view showing the relation of the auxiliary illumination luminous flux to the focus detection areas in the FIG. 3 device.

It is understood that the filters discussed below can be used in, for example, focus detection devices provided in cameras in which a photographer (either manually or automatically) can choose between a plurality of focus detection areas for performing a focus detection operation. The filters discussed below can be provided in the focus detection system illustrated in FIG. 2 for example, the only difference being that the inventive filters would be substituted for the filter IR in FIG. 2. Accordingly, the disclosure of Japanese Laid-Open Patent Application No. 63-82407 is incorporated herein by reference in its entirety. Additionally at least one auxiliary illumination light source, such as one of the light sources shown in FIG. 3 can be provided in focus detection devices of embodiments of the invention. Of course, as will be understood by those skilled in the art, the filter of the invention can be provided in locations other than the one illustrated in FIG. 2. Accordingly, the following discussion is focused mainly on the filters, rather than on the entire focus detection system.

Figure 1:
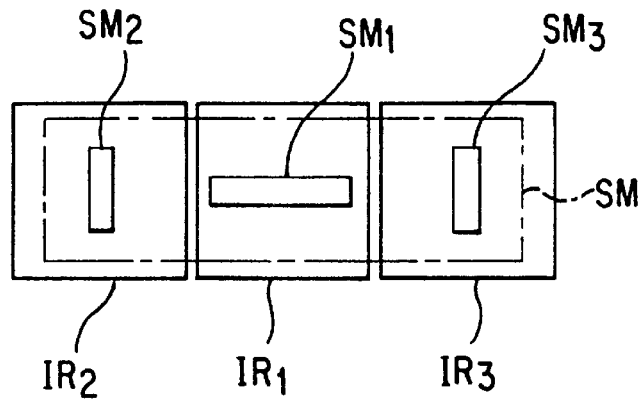
FIG. 1 is a front view of a first embodiment of a focus detection device according to the present invention.

FIG. 1 is a front view of a first embodiment of a focus detection device according to the present invention. In FIG. 1, openings SM1, SM2 and SM3, which correspond to the three focus detection areas in the front surface of the view field mask SM, are respectively covered by three infrared cut filters IR1, IR2 and IR3, all having the same size, shape and orientation. Focus detection with auxiliary illumination light is performed only in the center area SM1. Accordingly, filter IR1, which covers the aperture SM1, is set to block the transmission of light having wavelengths above about 710 nm. The filters IR2 and IR3 are set to block the transmission of light having wavelengths above about 680 nm. As a result, the left and right focus detection areas, in which focus detection is not performed with auxiliary illumination light, are not subject to the light source differences that affect focus detection accuracy from illumination during normal focus detection.

Figure 5:
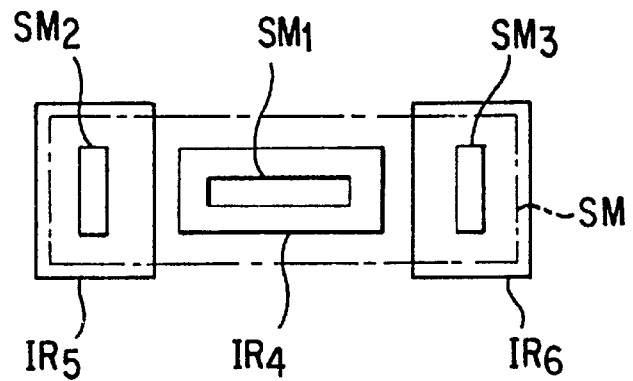
FIG. 5 is a front view of a second embodiment of a focus detection device according to the present invention.

FIG. 5 shows a second embodiment of the present invention. Similar to the first embodiment, the filter IR4, which corresponds to the center focus detection area, blocks the transmission of light having a wavelength above about 710 nm; and the filters IR5 and IR6, which correspond to the left and right focus detection areas, block the transmission of light having a wavelength above about 680 nm. In the example shown in FIG. 1, the three infrared cut filters have the same size, shape and orientation. In the second embodiment, the filters are formed so as to correspond to the form (i.e., size, shape and orientation) of the openings SM1–SM3 in the view field mask SM. As a result, the assembly operator can more easily identify the filters so that there is less of a possibility that mistakes in assembly of the infrared cut filter will occur.

Figure 6:
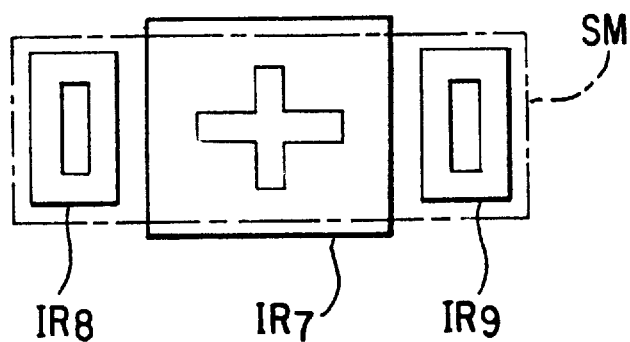
FIG. 6 is a front view of a third embodiment of a focus detection device according to the present invention.

FIG. 6 shows a different example of the filter form. In this example (the third embodiment), the center focus detection area is what is called a cross-type area. The center infrared cut filter IR7, which blocks the transmission of light having a wavelength above about 710 nm, is large, while the left and right focus detection area infrared cut filters IR8 and IR9, which block the transmission of light having a wavelength above about 680 nm, are smaller.

Figure 7:
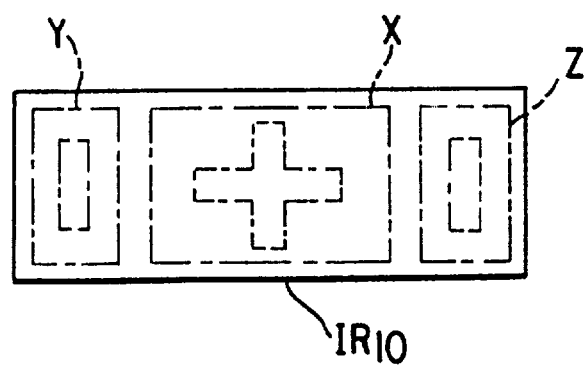
FIG. 7 is a front view of a fourth embodiment of a focus detection device according to the present invention.

FIG. 7 shows an example (the fourth embodiment) of an undivided (i.e., one-piece) filter. The infrared cut filter IR10 has a different light transmission characteristic at the region X, which corresponds to the center cross focus detection area, as compared to the regions Y and Z, which correspond to the left and right focus detection areas. In region X, the maximum wavelength of light that is transmitted is about 710 nm, and in regions Y and Z the maximum wavelength of light that is transmitted is about 680 nm. Because the regions X, Y and Z are assembled in one filter, the assembly operation can be shortened.

Placement of the filter is not limited to the front surface of the field lens, as in the described embodiments, but also may be placed on the rear surface of the field lens, or on the front surface of the aperture mask, for example. Additionally, in the event that the filter is a divided type of filter, it is not necessary that all of the filters be in the same position (i.e., in the same plane), but may be placed according to the placement of the optics for each of the focus detection areas.

As described above, a focus detection device of embodiments of the present invention, which performs focus detection with auxiliary illumination light and that has a plurality of focus detection areas, at least one of which is used for the auxiliary illumination light, includes a light cut filter that allows for the transmission of light having a maximum wavelength that is longer than the maximum wavelength transmitted through the light cut filter provided for the other areas. As a result, in areas in which focus detection is not performed by auxiliary illumination light, it is possible to prevent the exertion of influence from longer wavelengths.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focus detection device that performs focus detection in a plurality of focus detection areas within a photographic field, the focus detection device including:

a first light cut filter located in a light path of a first one of the plurality of focus detection areas, the first light cut filter substantially blocking light above a first wavelength from being transmitted through the first light cut filter; and a second light cut filter located in a light path of a second one of the plurality of focus detection areas, the second light cut filter substantially blocking light above a second wavelength from being transmitted through the second light cut filter, the second wavelength being different from the first wavelength.

2. The device of claim 1, wherein the second wavelength is longer than the first wavelength, and further comprising:

an auxiliary illumination light source that supplies auxiliary illumination light to the second one of the plurality of focus detection areas.

3. The device of claim 2, wherein the first one of the plurality of focus detection areas does not include an auxiliary illumination light source.

4. The device of claim 1, wherein the first light cut filter and the second light cut filter are separated from each other.

5. The device of claim 1, wherein the first light cut filter and the second light cut filter are formed on a single substrate.

6. The device of claim 1, wherein:

the focus detection device includes at least three of the focus detection areas;

the second light cut filter is located in the light path of one of the at least three focus detection areas; and the first light cut filter is located in the light paths of the remainder of the at least three focus detection areas.

7. The device of claim 6, wherein the second wavelength is longer than the first wavelength.

8. The device of claim 7, further comprising:

an auxiliary illumination light source that supplies auxiliary illumination light to the focus detection area that corresponds to an area of the second light cut filter.

9. The device of claim 1, further comprising:

at least one field lens in the focus detection device, the first light cut filter and the second light cut filter being located on an input side of the at least one field lens.

10. The device of claim 1, wherein the first and second light cut filters are infrared light cut filters that substantially block the transmission of light within the infrared light wavelengths.

11. The device of claim 4, wherein the first light cut filter and the second light cut filter have the same size, shape and orientation.

12. The device of claim 4, wherein at least one of the size, shape and orientation differs between the first light cut filter and the second light cut filter.

13. The device of claim 4, wherein at least one of the light cut filters is placed on a position that differs from a position of at least one other of the light cut filters with respect to an optical axis direction of the focus detection device.

14. A focus detection device capable of performing a focus detection operation in several focus detection areas within a photographic image plane, the focus detection device including, for each of the several focus detection areas:

a pair of re-imaging lenses;

a photoelectric conversion element on which the pair of re-imaging lenses form a secondary image; and a light filter that substantially blocks the transmission of light above a predetermined wavelength to the photoelectric conversion element; wherein:

the predetermined wavelength for the light filter in at least one of the several focus detection areas is different from the predetermined wavelength for the light filter in at least another one of the several focus detection areas.

15. The device of claim 14, wherein the light filters are infrared light cut filters that substantially block the transmission of light within the infrared light wavelengths.

16. The device of claim 14, wherein at least one of the light filters substantially blocks the transmission of light above 680 nm, and at least another one of the light filters substantially blocks the transmission of light above 710 nm.

17. The device of claim 14, wherein at least one of the light filters substantially blocks the transmission of light above a first wavelength and at least another one of the light filters substantially blocks the transmission of light above a second wavelength that is longer than the first wavelength, and further comprising:

an auxiliary illumination light source that supplies auxiliary illumination light through the at least another one of the light filters that substantially blocks the transmission of light above the second wavelength.

18. The device of claim 14, wherein each of the light filters are separated from each other.

19. The device of claim 18, wherein all of the light filters have the same size, shape and orientation.

20. The device of claim 18, wherein at least one of the size, shape and orientation differs between the light filters based on the wavelength of light blocked by the light filters.

21. The device of claim 18, wherein at least one of the light filters is placed on a position that differs from a position of at least one other of the light filters with respect to an optical axis direction of the focus detection optical system.

22. The device of claim 14, wherein all of the light filters are formed on a single substrate.

23. The device of claim 14, further comprising:

at least one field lens in the focus detection device, the light filters being located on an input side of the at least one field lens.

* * * * *